US012341775B2

(12) United States Patent
Mori

(10) Patent No.: US 12,341,775 B2
(45) Date of Patent: Jun. 24, 2025

(54) DEVICE AND STORAGE MEDIUM STORING COMPUTER PROGRAM

(71) Applicant: BROTHER KOGYO KABUSHIKI KAISHA, Nagoya (JP)

(72) Inventor: Kyohei Mori, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 282 days.

(21) Appl. No.: 18/194,704

(22) Filed: Apr. 3, 2023

(65) Prior Publication Data
US 2023/0328061 A1   Oct. 12, 2023

(30) Foreign Application Priority Data

Apr. 8, 2022  (JP) ................................. 2022-064709

(51) Int. Cl.
*H04L 9/40* (2022.01)
*G06F 21/71* (2013.01)
*G06F 21/73* (2013.01)
*G06F 21/85* (2013.01)

(52) U.S. Cl.
CPC ................ *H04L 63/0876* (2013.01)

(58) Field of Classification Search
None
See application file for complete search history.

(56) References Cited

U.S. PATENT DOCUMENTS

| | | | | |
|---|---|---|---|---|
| 9,503,896 | B2* | 11/2016 | Zhong | H04W 4/023 |
| 2003/0149917 | A1* | 8/2003 | Smith | G06F 3/1204 |
| | | | | 714/38.14 |
| 2007/0076875 | A1* | 4/2007 | Kaechi | H04W 12/50 |
| | | | | 713/168 |
| 2021/0072931 | A1* | 3/2021 | Matsushima | G06F 13/00 |

FOREIGN PATENT DOCUMENTS

WO   2017/150472 A1   9/2017

* cited by examiner

*Primary Examiner* — Venkat Perungavoor
(74) *Attorney, Agent, or Firm* — Merchant & Gould P.C.

(57) ABSTRACT

A controller of a device is configured to receive, via a communication interface, device identification information indicating the device and connection information for connecting to a target server from an intermediary server; connect, via the communication interface, to the target server by using the connection information; after connecting to the target server, perform a particular process including communication with the target server, the particular process including: receiving, via the communication interface, authentication information from the target server; verifying whether the authentication information is authentic; in response to determining that the authentication information is authentic and that a particular condition is satisfied, performing a post-authentication process without performing an update process of updating the authentication information; and in response to determining that the authentication information is authentic and that the particular condition is not satisfied, performing the update process and the post-authentication process.

18 Claims, 11 Drawing Sheets

FIG. 2A
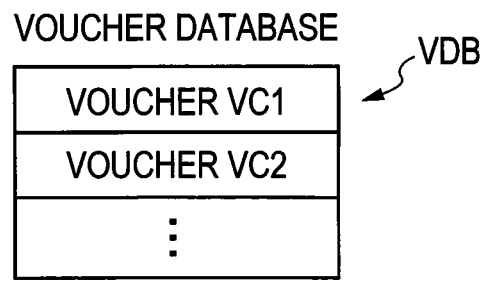
FIG. 2B
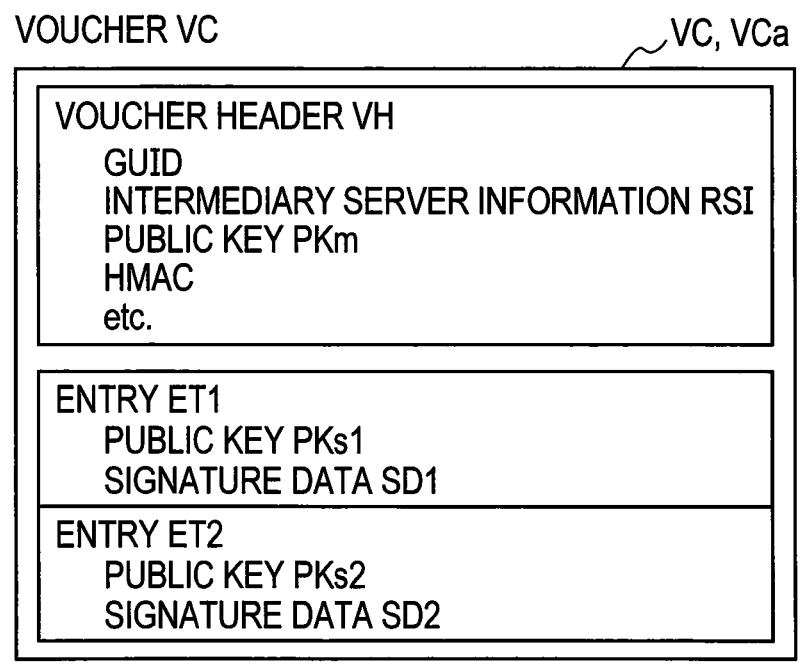
FIG. 2C
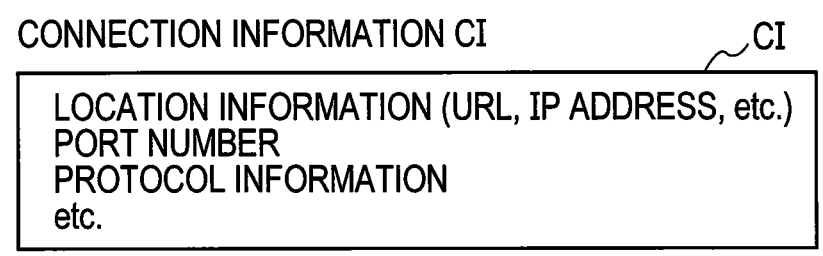
FIG. 2D
CONNECTION INFORMATION CI
```
LOCATION INFORMATION (URL, IP ADDRESS, etc.)
PORT NUMBER
PROTOCOL INFORMATION
etc.
```

DEVICE AND STORAGE MEDIUM STORING COMPUTER PROGRAM

REFERENCE TO RELATED APPLICATIONS

This application claims priority from Japanese Patent Application No. 2022-064709 filed on Apr. 8, 2022. The entire content of the priority application is incorporated herein by reference.

BACKGROUND ART

A system including a multifunction peripheral (MFP) connected to a server is known.

DESCRIPTION

In a system, a multifunction peripheral (MFP) accesses a connection-destination providing server and receives a URL of the server that stores an application. The MFP accesses the server using the received URL and downloads the application.

In the above technology, however, it cannot be said that sufficient ingenuity has been made for the mechanism of authentication performed between the MFP and the server. As a result, there is a possibility that a problem occurs in terms of security and convenience of the system including the MFP.

In view of the foregoing, an example of an object of this disclosure is to provide a technique that achieves both security and convenience of a system including a device.

According to one aspect, this specification discloses a device including a communication interface and a controller. The controller is configured to receive, via the communication interface, device identification information and connection information from an intermediary server. The device identification information indicates the device. The intermediary server is configured to store the device identification information and the connection information in association with each other. The connection information is information for connecting to a target server. The target server is configured to store authentication information in association with the device identification information. Thus, the device identification information and the connection information are received from the intermediary server. The controller is configured to connect, via the communication interface, to the target server by using the connection information. Thus, the device is connected to the target server. The controller is configured to, after connecting to the target server, perform a particular process including communication with the target server. In the particular process, the controller is configured to receive, via the communication interface, the authentication information from the target server, and verify whether the authentication information is authentic. Thus, the authentication information is received and it is verified whether the authentication information is authentic. In the particular process, the controller is configured to: in response to determining that the authentication information is authentic and that a particular condition is satisfied, perform a post-authentication process without performing an update process of updating the authentication information; and in response to determining that the authentication information is authentic and that the particular condition is not satisfied, perform the update process and the post-authentication process. In a case where the update process of the authentication information is not performed, after that, another target server can use the same authentication information. Thus, if the update process of the authentication information is never performed, the security of the system including the device may deteriorate. In a case where the update process of the authentication information is performed, after that, another target server cannot use the same authentication information. Thus, if the update process of the authentication information is always performed, the convenience of the system may deteriorate. The update process of the authentication information is not performed when the particular condition is satisfied, and the update process is performed when the particular condition is not satisfied. Thus, both the security and convenience of the system including the device are achieved.

The technology disclosed herein may be implemented in various forms, for example, a system including a target server and a device, a method in a device or a system, a computer program for realizing functions of these devices and method, a storage medium storing the computer program, and so on.

FIGS. 2A, 2B, 2C and 2D are explanatory diagrams of databases and information stored in the databases.

A. First Embodiment

A-1. Configuration of System 1000

Figure 1:
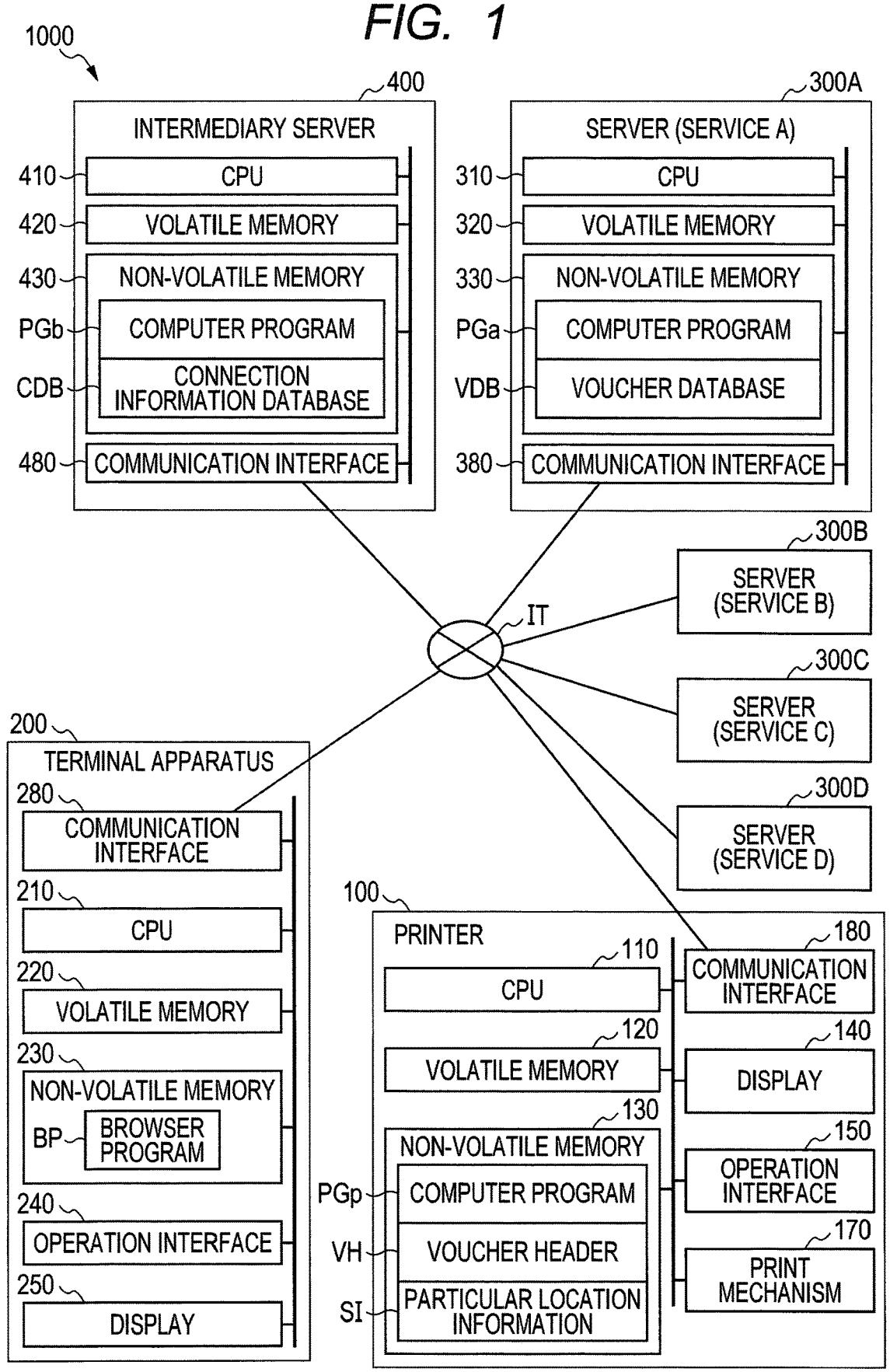
FIG. 1 is a block diagram showing a configuration of a system 1000.

As shown in FIG. 1, the system 1000 includes a printer 100, a terminal apparatus 200 owned by a sales company of the printer 100, servers 300A to 300D that provide services using printers, and an intermediary server 400.

The printer 100 includes, as a controller of the printer 100, a CPU 110, a volatile memory 120 such as a DRAM, and a non-volatile memory 130 such as a hard disk or flash memory. The printer 100 also includes a display 140 such as a liquid crystal display for displaying images, an operation interface 150 such as buttons and a touch panel for acquiring user operations, a print mechanism 170 (print engine), and a communication interface (IF) 180.

The communication interface 180 is an interface for connecting to the Internet IT, such as a wired interface conforming to Ethernet or a wireless interface conforming to the Wi-Fi standard. "Ethernet" is a registered trademark of Ethernet, LLC.

The CPU 110 is an arithmetic device (processor) that performs data processing. The volatile memory 120 provides a buffer area for temporarily storing various intermediate data generated when CPU 110 performs processing. The non-volatile memory 130 stores a computer program PGp for controlling the printer 100, a voucher header VH described later, and particular location information SI.

In this embodiment, the computer program PGp is preliminarily stored in the non-volatile memory 130 when the printer 100 is manufactured. Alternatively, the computer program PGp may be provided, for example, in a form downloaded from a server connected via the Internet IT, or in a form recorded on a CD-ROM and so on.

The CPU 110 controls the printer 100 by executing the computer program PGp. For example, as will be described later, the CPU 110 cooperates with any one of the servers 300A to 300D to execute a process (hereinafter also referred to as a service process) of providing the user with a particular service (for example, a setup service, a consumable management service, and a print service described later). In addition, as will be described later, prior to the service process, the CPU 110 cooperates with the terminal apparatus 200, the target server and the intermediary server 400 to perform advance preparation described later.

The particular location information SI is information used in the advance preparation described later. The particular location information SI is location information (IP address or URL) of a particular server among target servers (the servers 300A to 300D), and in this embodiment, location information of the servers 300A and 300B. The particular location information SI is stored in the non-volatile memory 130 at the factory when the printer 100 is manufactured.

The print mechanism 170 executes printing under the control of the CPU 110. The print mechanism 170 of this embodiment is an inkjet print mechanism that prints an image on a recording medium using ink of a plurality of types (for example, ink of four types of cyan, magenta, yellow, and black) as colorant. Alternatively, the print mechanism 170 may be an electrophotographic print mechanism that prints an image on a recording medium using toner as colorant.

The terminal apparatus 200 is a computer such as a personal computer, for example. In a modification, the terminal apparatus 200 may be a smartphone or tablet computer. The terminal apparatus 200 is, for example, a computer owned by a sales company B (described later) that sells the printer 100 to users.

The terminal apparatus 200 includes, as a controller, a CPU 210, a volatile memory 220 such as a DRAM, and a non-volatile memory 230 such as a hard disk or flash memory. The terminal apparatus 200 also includes a display 250 such as a liquid crystal display for displaying images, an operation interface 240 such as buttons and a touch panel for acquiring user operations, and a communication interface 280. The communication interface 280 is an interface for connecting to the Internet IT, such as a wired interface conforming to Ethernet or a wireless interface conforming to the Wi-Fi standard.

The volatile memory 220 provides a buffer area for temporarily storing various intermediate data generated when the CPU 210 performs processing. A browser program BP is stored in the non-volatile memory 230.

The CPU 210 functions as a WEB browser by executing the browser program BP. The CPU 210 functioning as a WEB browser executes a process of registering vouchers VC described later in the servers 300A and 300B.

The servers 300A to 300D are, for example, computers operated by service providers, such as cloud servers. For example, the companies that operate the servers 300A to 300D are the company that manufactures the printer 100 or a third party that is different from the company. Each of the servers 300A to 300D may include two or more servers operated by two or more different operators. Services provided by the servers 300A to 300D are referred to as services A to D, respectively. The services A to D include, for example, a setup service, a consumable management service, and a print service. The setup service is, for example, a service for installing programs such as drivers and applications in the printer 100 and performing particular settings. The consumable management service is, for example, a service that manages the remaining amount of consumables such as ink in the printer 100 and delivers the consumables to the user according to the consumption of the consumables. The print service is, for example, a service that causes the printer 100 to perform printing by generating a print job using an image file transmitted from the user's terminal and transmitting the generated print job to the printer 100.

The server 300A includes a CPU 310 as a controller, a volatile memory 320 such as a DRAM, a non-volatile memory 330 such as a hard disk or flash memory, and a communication interface (IF) 380. The communication interface 380 is, for example, a wired interface conforming to Ethernet.

The CPU 310 is an arithmetic device (processor) that performs data processing. The volatile memory 320 provides a buffer area for temporarily storing various intermediate data generated when the CPU 310 performs processing. The non-volatile memory 330 stores a computer program PGa and a voucher database VDB described later.

The computer program PGa is provided, for example, in a form of being uploaded by an operator who operates the server 300A. The CPU 310 of the server 300A cooperates with the printer 100 by executing the computer program PGa to execute a service process for realizing the service to be provided. In addition, prior to the service process, the CPU 310 cooperates with the terminal apparatus 200 and the intermediary server 400 to execute advance preparation described later.

The servers 300B to 300D have configurations 310 to 380 (not shown) similar to those of the server 300A described above. A description of the configuration of the servers 300B to 300D is omitted.

The intermediary server 400 is a computer, for example, a cloud server, operated by a particular business operator (for example, a company that provides a service or a company that manufactures the printer 100). Like the server 300A, the intermediary server 400 includes a CPU 410 as a controller, a volatile memory 420, a non-volatile memory, and a communication interface 480. The volatile memory 420 provides a buffer area for temporarily storing various intermediate data generated when the CPU 410 performs processing. The non-volatile memory 430 stores a computer program PGb and a connection information database CDB described later.

The computer program PGb is provided, for example, in a form of being uploaded by a company who operates the intermediary server 400. The CPU 410 of the intermediary server 400 cooperates with the printer 100, the terminal apparatus 200, and the servers 300A to 300D by executing the computer program PGb to execute advance preparations described later.

Each of the printer 100, the terminal apparatus 200, the servers 300A to 300D, and the intermediary server 400 is connected to the Internet IT. Thus, these devices 100-400 communicate with each other via the Internet IT.

FIG. 2A illustrates an example of a voucher database VDB stored in the non-volatile memory 330 of the servers 300A to 300D. The voucher database VDB stores one or more vouchers VC (VC1, VC2 in FIG. 2A, for example).

FIG. 2B illustrates an example of the voucher VC. The voucher VC is data which certifies ownership of a device (in this embodiment, the printer 100). The voucher VC includes a voucher header VH and one or more entries ET (ET1, ET2 in FIG. 2B, for example).

The voucher header VH includes a GUID, intermediary server information RSI, a public key PKm, and HMAC. The GUID is an identifier which identifies the printer 100. The intermediary server information RSI is information for connecting communication with the intermediary server 400. The intermediary server information RSI includes information indicating the location of the intermediary server 400 (IP address or URL (Uniform Resource Locator), for example), a port number, and information on a protocol to be used for connection. The public key PKm is a public key corresponding to a private key owned by a manufacturer of the printer 100. The HMAC (hash message authentication code) is a message authentication code, and is calculated by using a private key (not shown) owned by the printer 100, a hash function, and data (the voucher header VH and a secret owned by the printer 100, for example), for example.

As shown in FIG. 1, the voucher header VH is also stored in the non-volatile memory 130 of the printer 100.

The entry ET includes a public key PKs and signature data SD. The entry ET is information that is added each time the delivery of voucher VC is performed, that is, each time the owner of the voucher VC is changed. The public key PKs is a public key corresponding to a private key owned by a delivery destination, while the signature data SD is data obtained by encrypting the public key PKs by using the private key owned by the delivery source. The voucher VC in FIG. 2B includes two entries ET1, ET2. Thus, it is known that the delivery of the voucher VC in FIG. 2B has been performed twice. The entry ET and the HMAC included in the voucher VC are used for an authentication process in an onboarding process described later.

FIG. 2C illustrates an example of a connection information database CDB. The connection information database CDB stores one or more pieces of connection information (connection destination information) CI in association with the GUID. In the example in FIG. 2C, connection information CI1 is stored in association with the GUID "ID1", and connection information CI2 is stored in association with the GUID "ID2". Each of the connection information CI is information which should be transmitted to the device (the printer 100, for example) identified by the associated GUID.

FIG. 2D illustrates an example of connection information CI. The connection information CI is information for connecting communication with a server (the server 300A, for example) to execute a service process in cooperation with the device (the printer 100, for example). The connection information CI includes information indicating the location (IP address, URL (Uniform Resource Locator), for example) of the server (the server 300A, for example) to execute the service process, a port number, and information on a protocol to be used for connection, for example.

A-2. Process from Manufacture of Printer 100 to Advance Preparations for Service Hereinafter, processes from the manufacture of the printer 100 to advance preparations for service will be explained. In this embodiment, the printer 100 is manufactured by a manufacturer and delivered to a sales company B via a sales company A. After that, the printer 100 is delivered from the sales company B to a user A, and is connected to the servers 300A and 300B which provides services A and B such that a service process is executable.

Figure 3:
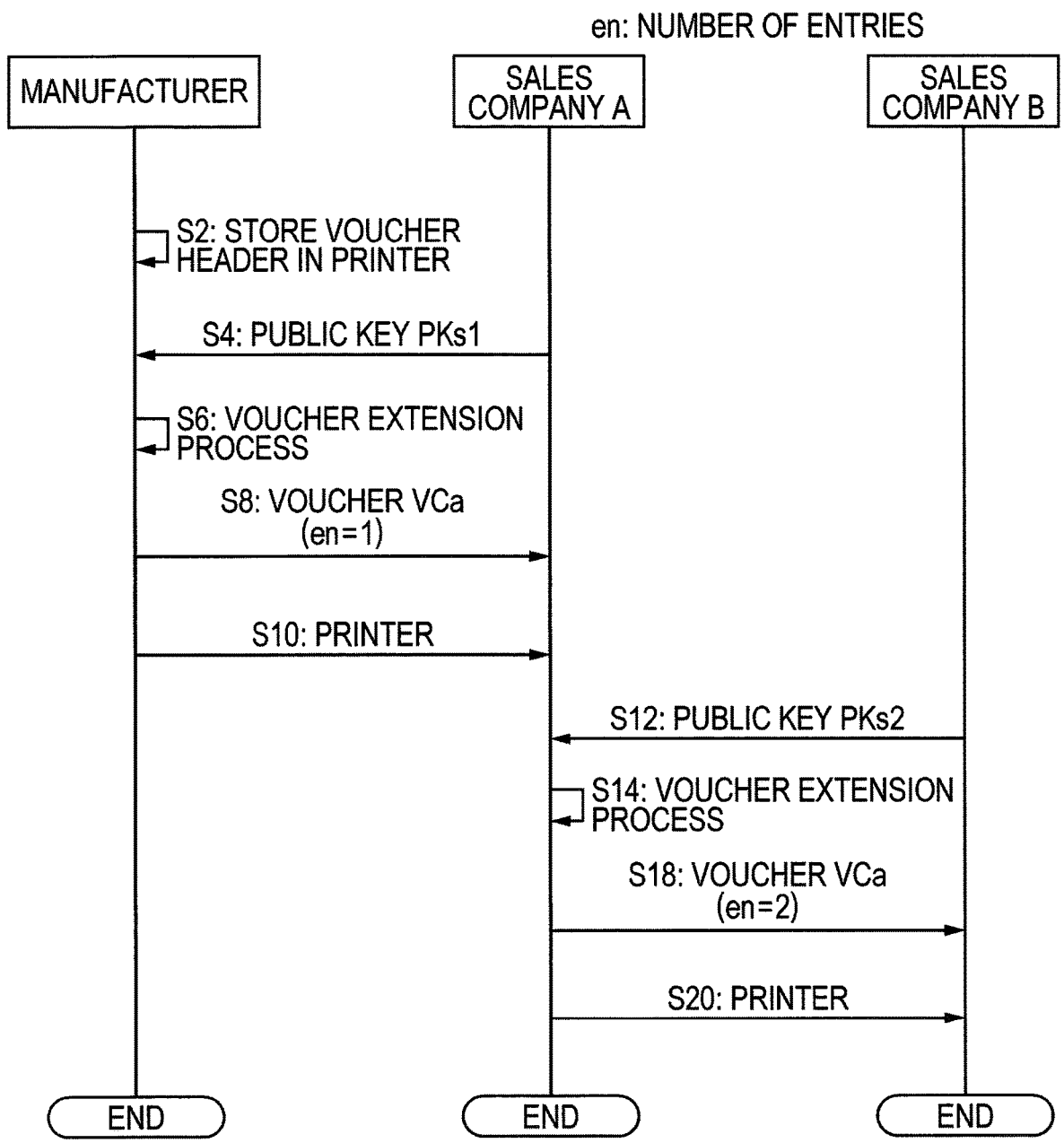
FIG. 3 is a sequence diagram showing that a printer 100 is delivered to sales companies.

FIG. 3 shows processes in which the printer 100 is delivered from the manufacturer to the sales company B via the sales company A.

In S2, in the manufacture process of the printer 100, the voucher header VH is stored in the printer 100. The storage of the voucher header VH is performed in compliance with DI (Device Initialize Protocol) specified in the "FIDO Device Onboarding (FDO) Specification" (hereinafter, also referred to as the FDO specification), which is a standard specification open to the public by the FIDO Alliance, for example. Accordingly, the voucher header VH in the voucher VC in FIG. 2B is generated and stored in the non-volatile memory 130 of the printer 100.

In S4 to S10, the voucher VCa and the printer 100 are delivered from the manufacturer to the sales company A. In S4, the manufacturer receives a public key PKs1 from the sales company A. For example, the sales company A prepares a key pair of the private key and the public key PKs1, and when the printer 100 is ordered, transmits the public key PKs1 from a computer (not shown) of the sales company A to a computer (not shown) of the manufacturer. In S6, the manufacturer executes a voucher extension process by using the computer. For example, the computer of the manufacturer generates the entry ET1 (FIG. 2B) including the public key PKs1 received from the sales company A, and signature data SD1 acquired by encrypting the public key PKs1 by using the private key of the manufacturer. The private key of the manufacturer is a private key corresponding to the public key PKm (FIG. 2B) included in the voucher header VH generated in S2. In S8, the computer of the manufacturer transmits the voucher VCa including the voucher header VH and one entry ET1 to the computer of the sales company A. In S10, the printer 100 is delivered from the manufacturer to the sales company A.

In S12 to S20, the voucher VCa and the printer 100 are delivered from the sales company A to the sales company B. In S12, the sales company A receives a public key PKs2 from the sales company B. For example, the sales company B prepares a key pair of the private key and the public key PKs2, and when the printer 100 is ordered, transmits the public key PKs2 from the terminal apparatus 200 of the sales company B to the computer (not shown) of the sales company A. In S14, the sales company A executes a voucher extension process by using the computer. For example, the computer of the sales company A generates the entry ET2 (FIG. 2B) including the public key PKs2 received from the sales company B, and signature data SD2 acquired by encrypting the public key PKs2 by using the private key of the sales company A. The private key of the sales company A is a private key corresponding to the public key PKs1 of the sales company A transmitted to the manufacturer in S4. In S18, the computer of the sales company A transmits, to the terminal apparatus 200 of the sales company B, the voucher VCa in which the entry ET2 is added to the voucher VCa received from the manufacturer. In S20, the printer 100 is delivered from the sales company A to the sales company B.

Thus, a number of entries ET (also referred to as number of entries en) included in the voucher VCa received by the sales company A from the manufacturer is 1. The number of entries en of the voucher VCa received by the sales company B from the sales company A is 2.

Figure 4:
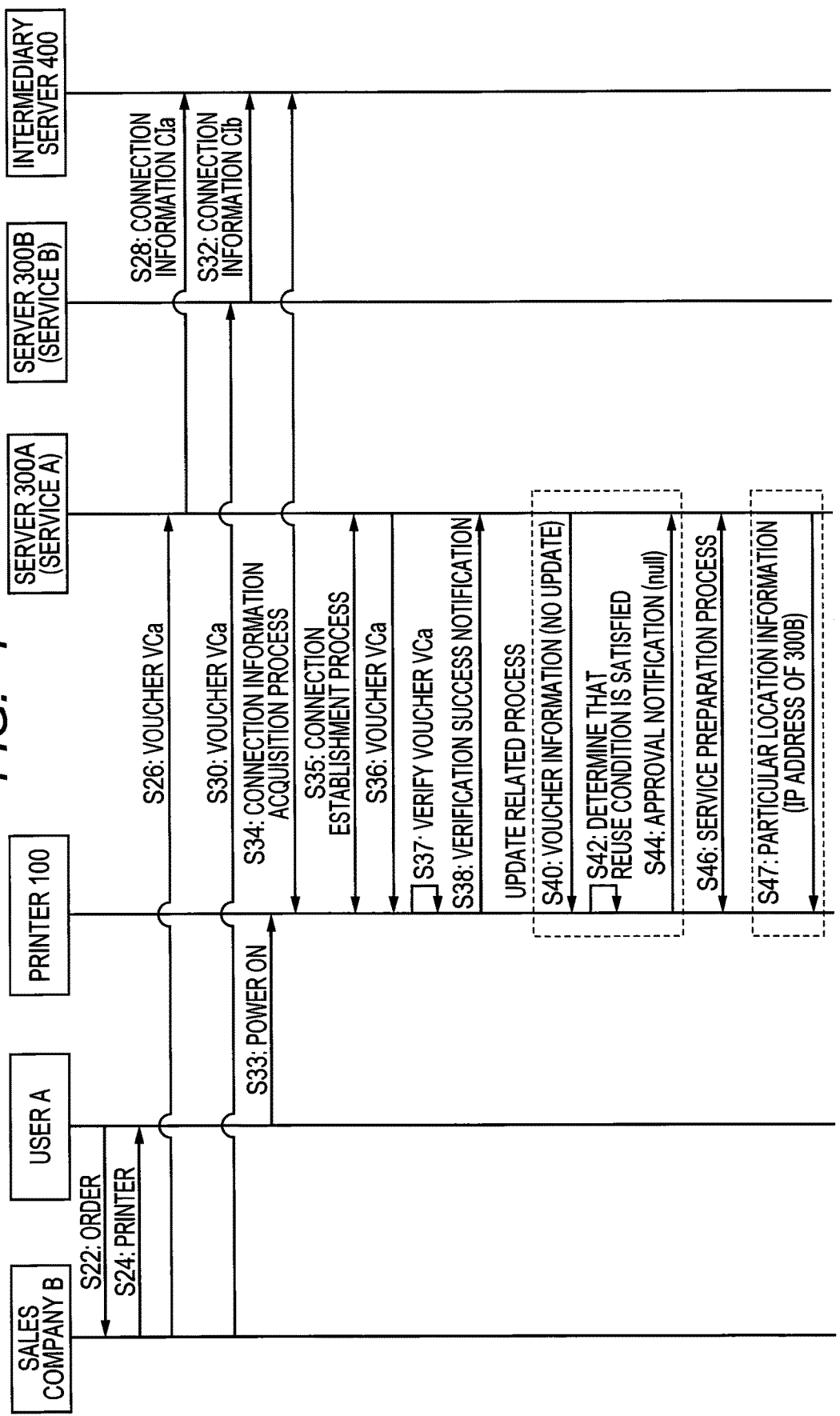
FIG. 4 is a first sequence diagram that the printer 100 is connected to servers 300A and 300B such that a service process is executable.
Figure 5:
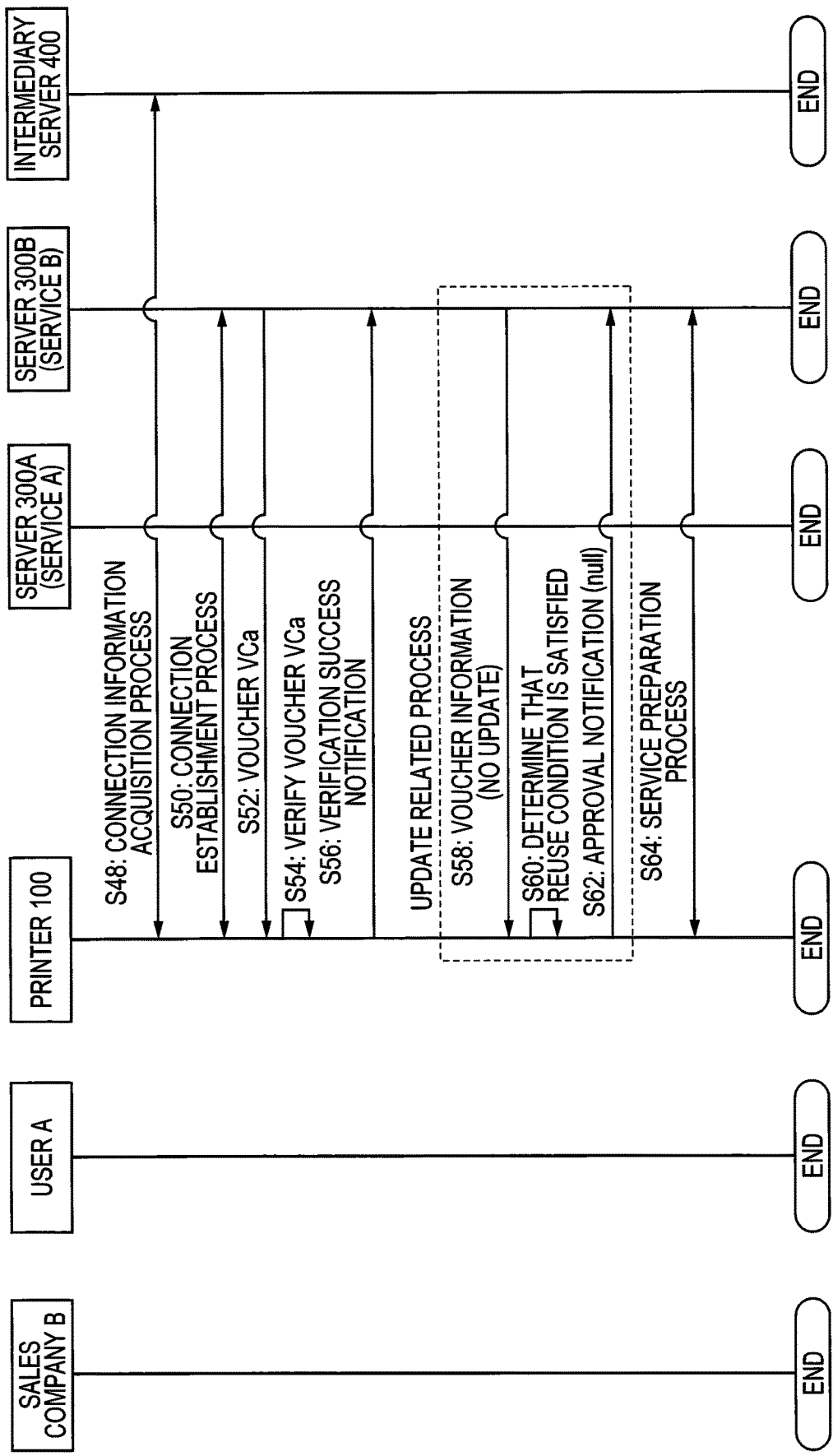
FIG. 5 is a second sequence diagram that the printer 100 is connected to the servers 300A and 300B such that the service process is executable.

FIGS. 4 and 5 show processes in which the printer 100 is delivered from the sales company B to the user A and is connected to the servers 300A and 300B such that a service process is executable.

When the user A places an order for the printer 100 in S22, the sales company B ships the ordered printer 100 in S24. It is assumed that when the printer 100 is ordered, a contract for using the service A and the service B is concluded between the sales company B and the user A.

The sales company B ships the printer 100, and executes S26 and S30 before the printer 100 arrives at the user A.

In S26, the sales company B registers the voucher VCa in the server 300A that provides the service A to be used. Specifically, a person at the sales company operates the terminal apparatus 200 to access a WEB page provided by the server 300A and perform a particular operation. Accordingly, the terminal apparatus 200 transmits the voucher VCa to the server 300A. The server 300A stores the received voucher VCa in the voucher database VDB (FIG. 2A).

In S30, the sales company B registers the voucher VCa in the server 300B that provides the service B to be used. For example, similar to S26, the terminal apparatus 200 transmits the voucher VCa to the server 300B, and the server 300B stores the received voucher VCa in the voucher database VDB (FIG. 2A). Here, a server that provides a service to be used is also called a target server. In the example of FIG. 4, the servers 300A and 300B (FIG. 1) providing the services A and B are target servers.

In the present embodiment, when the voucher VCa is registered in the target server, an extension process of the voucher VCa is not executed, and thus the number of entries en in the voucher VCa does not increase. In a modification, when the voucher VCa is registered in the target server, the extension process of the voucher VCa may be executed. For example, the server 300A has a key pair of a private key and a public key, and transmits the public key to the terminal apparatus 200. The terminal apparatus 200 generates an entry including the public key and signature data obtained by encrypting the public key using the private key of the sales company (the private key corresponding to the public key PKs2). The terminal apparatus 200 transmits, to the server 300A, the voucher VCa in which one entry is added to the voucher VCa received from the sales company A. In this case, the number of entries en in the voucher VCa registered in the server 300A is 3.

In a modification, the sales company B may deliver the voucher VCa to the user A, and the user A may register the voucher VCa in the servers 300A and 300B from the terminal apparatus of the user A.

In response to receiving the voucher VCa, the server 300A registers connection information CIa in the intermediary server 400 in S28. The connection information CIa is connection information CI (FIG. 2D) for connecting to the server 300A. Registration of the connection information CIa is executed according to TO0 (Transfer Ownership Protocol 0) defined in the FDO specifications. For example, the connection information CIa and the GUID of the printer 100 included in the received voucher VCa are transmitted from the server 300A to the intermediary server 400. The intermediary server 400 stores the received connection information CIa in the connection information database CDB (FIGS. 1 and 2C) in association with the GUID of the printer 100. As a result, the connection information CIa is registered (stored) in the intermediary server 400 in association with the GUID of the printer 100.

In response to receiving the voucher VCa, the server 300B registers the connection information CIb in the intermediary server 400 in S32. The connection information CIb is connection information CI for connecting to the server 300B. Registration of the connection information CIa is performed in the same manner as in S28. As a result, the connection information CIb is registered in the intermediary server 400 in association with the GUID of the printer 100.

When the printer 100 is delivered to the user A, the user A installs the delivered printer 100 so as to be connectable to the Internet IT, and turns on the printer 100 in S33.

When the printer 100 is turned on, a connection information acquisition process is executed between the printer 100 and the intermediary server 400 in S34. For example, the printer 100 reads the intermediary server information RSI included in the voucher header VH (FIG. 1) stored in the non-volatile memory 130. The printer 100 establishes a communication connection with the intermediary server 400 using the intermediary server information RSI, and executes the connection information acquisition process. The connection information acquisition process is executed according to TO1 (Transfer Ownership Protocol 1) defined in the FDO specifications. Specifically, the printer 100 transmits the GUID included in the voucher header VH, that is, the GUID identifying the printer 100 to the intermediary server 400. The intermediary server 400 sequentially transmits, to the printer 100, the connection information CIa and CIb associated with the received GUID in the connection information database CDB one by one. Accordingly, in the initial connection information acquisition process, the printer 100 acquires the connection information CIa for connecting to the server 300A.

In S35 to S46, an onboarding process is performed between the printer 100 and the server 300A. The onboarding process is performed according to TO2 (Transfer Ownership Protocol 2) defined in the FDO specification.

In S35, a connection establishment process is executed between the printer 100 and the server 300A. The connection establishment process is, for example, a process of establishing a connection between an application running on the printer 100 and an application running on the server 300A according to TCP (Transmission Control Protocol) and IP (Internet Protocol). For example, the printer 100 reads the acquired connection information CI from the non-volatile memory 130 and uses the connection information CI to transmit a connection request to the server 300A, thereby executing the connection establishment process.

In S36 to S38, an authentication process is executed. For example, in S36, the server 300A acquires the voucher VCa including the GUID of the printer 100 from the voucher database VDB, and transmits the voucher VCa to the printer 100. In S37, the printer 100 verifies the authenticity of the server 300A by verifying the voucher VCa.

For example, the printer 100 sequentially verifies the entries ET1 and ET2 included in the voucher VCa. For example, the printer 100 verifies the entry ET1 using the public key PKm included in the voucher header VH. The printer 100 verifies the entry ET2 using the public key PKs1 included in the verified entry ET1. Finally, the printer 100 uses public key PKs2 included in the verified entry ET2 to verify the authenticity of the signature data (not shown) transmitted from the server 300A, thereby verifying the authenticity of the server 300A.

In response to succeeding in verifying the authenticity of the voucher VCa, in S38, the printer 100 transmits, to the server 300A, a verification success notification indicating that the verification is successful. Note that the printer 100 suspends the onboarding process (not shown) when the verification of the voucher VCa fails.

In the authentication process of the onboarding process, the server 300A also uses a token conforming to a particular format (for example, an EAT (Entity Attestation Token) format) to verify the authenticity of the printer 100, but the illustration and description thereof are omitted. The onboarding process is also suspended when the server 300A fails to verify the authenticity of the printer 100.

In S40 to S44, an update related process, which is processing related to updating the voucher VC, is executed between the printer 100 and the server 300A. Before describing S40 to S44, a voucher update process will be described with reference to another flowchart.

Figure 6:
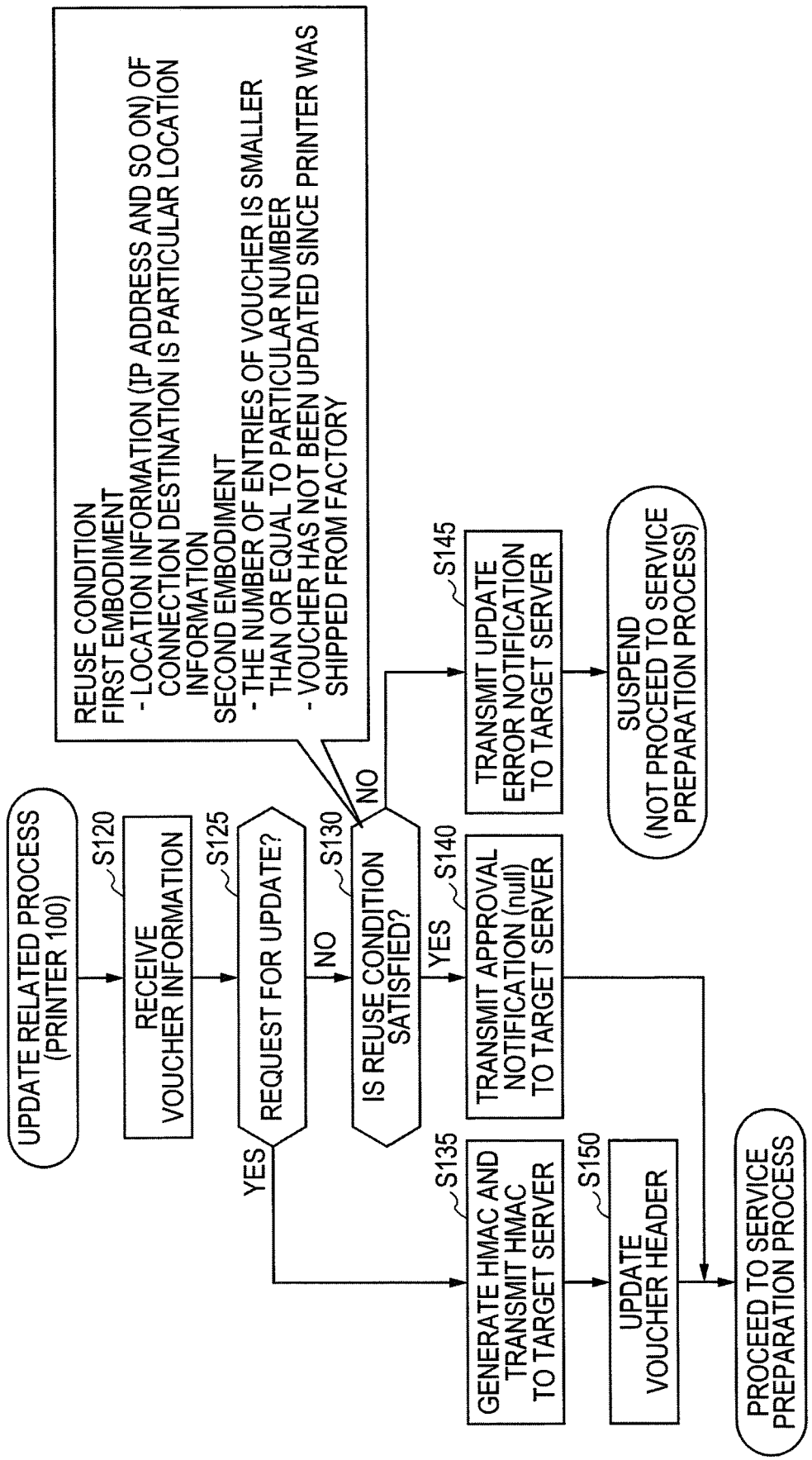
FIG. 6 is a flowchart of processing executed by the printer 100 in an update related process.

FIG. 6 is a flowchart of processing executed by the printer 100 in the update related process. In S120, the printer 100 receives voucher information from the target server (for example, the server 300A).

The voucher information includes information other than HMAC in the voucher header VH (FIG. 2B), such as the GUID, the intermediary server information RSI and the public key. Here, there are two types of the voucher information transmitted from the target server: non-update voucher information and updated voucher information. The non-update voucher information is the voucher information included in the currently valid voucher VC. That is, it is the voucher information included in the voucher VC used for the authentication process in the ongoing onboarding process. The updated voucher information is different from the voucher information included in the currently valid voucher VC. The updated voucher information includes, for example, a GUID and a public key that have been newly generated by the target server.

It can be said that the non-update voucher information is a maintain request requesting the printer 100 not to update the voucher VC, that is, to keep the current voucher VC valid. It can be said that the updated voucher information is an update request requesting the printer 100 to update the voucher VC, that is, invalidate the current voucher VC and generate a new voucher VC. Once the voucher VC is updated, the current voucher VC will not be treated as a valid voucher VC in subsequent onboarding processes. If the voucher VC is not updated, the current voucher VC will be treated as a legitimate voucher VC in subsequent onboarding processes.

In S125, the printer 100 determines whether the received voucher information is an update request or a maintain request. For example, the printer 100 determines whether the received voucher information is updated voucher information or non-update voucher information based on a comparison with the voucher header VH stored in the non-volatile memory 130.

If the received voucher information is updated voucher information, that is, an update request (S125: YES), the printer 100 generates a new HMAC and transmits the HMAC to the target server in S135. For example, the new HMAC is generated using a private key (not shown) owned by the printer 100, a hash function, the received voucher information, and a secret newly generated by the printer 100.

In S150, the printer 100 updates the voucher header VH stored in the non-volatile memory 130. The updated voucher header VH includes the voucher information received in S120 and the HMAC generated in S135.

If the received voucher information is non-update voucher information, that is, a maintain request (S125: NO), the printer 100 determines in S130 whether a reuse condition is satisfied. The reuse condition is a condition for permitting reuse without updating the voucher VC. The reuse condition of the first embodiment is that the location information (for example, IP address) of a target server to connect to is the particular location information SI. In the present embodiment, as described above, the location information of the server 300A and the server 300B is recorded as the particular location information SI in the non-volatile memory 130 of the printer 100 (FIG. 1). Thus, the printer 100 determines that the reuse condition is satisfied when the server 300A is the target server and when the server 300B is the target server. The printer 100 determines that the reuse condition is not satisfied when a server different from the servers 300A and 300B (for example, the server 300C or 300D) is the target server.

If the reuse condition is satisfied (S130: YES), in S140 the printer 100 transmits, to the target server, an approval notification indicating that it is permitted to maintain the voucher VC without updating the same as a response to the non-update voucher information (maintain request). In the present embodiment, the approval notification is a value indicating null.

When the voucher header has been updated (S150) and when the approval notification has been transmitted (S140), the printer 100 continues the onboarding process and proceeds to a service preparation process, which will be described later.

If the reuse condition is not satisfied (S130: NO), in S145 the printer 100 transmits, to the target server, an update error notification indicating that it is not permitted to maintain the voucher VC without updating the same as a response to the non-update voucher information (maintain request). It can be said that the update error notification is information indicating that the voucher VC should be updated.

In a case where the update error notification is transmitted, the printer 100 suspends the onboarding process. In this case, the printer 100 does not proceed the process to the service preparation process at this point.

Returning to FIG. 4, the description continues. In S40 of FIG. 4, the server 300A transmits, to the printer 100, the non-update voucher information, that is, the maintain request for the voucher VC described above (S120 of FIG. 6). The target servers (servers 300A to 300D) of the present embodiment are designed to, in the first onboarding process, transmit a maintain request (non-update voucher information) after the authentication process. As will be described later, when the printer 100 does not allow maintaining the voucher VC without updating the same, the target server is designed to execute the onboarding process again and transmits an update request.

In response to receiving the non-update voucher information (S120 and NO in S125 of FIG. 6), the printer 100 determines whether the reuse condition is satisfied (S130 of FIG. 6). In the example of FIG. 4, the target server is the server 300A, and thus the location information (for example, IP address) of the target server matches one piece of location information included in the particular location information SI. Thus, in the example of FIG. 4, the printer 100 determines in S42 that the reuse condition is satisfied (YES in S130 of FIG. 6), and in S44, the printer 100 transmits an approval notification to the server 300A (S140 of FIG. 6).

In S46 of FIG. 4, the service preparation process is executed between the printer 100 and the server 300A. The service preparation process is a process of exchanging the service information necessary for executing the service process between the printer 100 and the server 300A. The service information includes, for example, tokens, format information, and protocol information used when performing communication regarding the service process between the printer 100 and the server 300A. The printer 100 is onboarded to the server 300A by the service preparation process. Here, "the printer 100 is onboarded to the target server" means "the printer 100 becomes ready to execute the service process in cooperation with the target server".

After completing the onboarding process with the server 300A, the printer 100 executes the connection information acquisition process again with the intermediary server 400 in S48 of FIG. 5. In this second connection information acquisition process, the printer 100 acquires the connection information CIb for connecting to the server 300B.

In S50 to S64 of FIG. 5, the onboarding process is executed between the printer 100 and the server 300B. The processing of S50 to S64 of FIG. 5 is executed in the same manner as the processing of S35 to S46 of FIG. 4.

In S50, a connection establishment process is executed between the printer 100 and the server 300B. In S52, the server 300B transmits the voucher VCa to the printer 100. In S54, the printer 100 verifies the authenticity of the server 300B by verifying the voucher VCa. When the verification of the voucher VCa is successful, in S56 the printer 100 transmits, to the server 300B, a verification success notification indicating that the verification has been successful.

In S58 to S62, an update related process is executed between the printer 100 and the server 300B. In S58 of FIG. 5, the server 300B transmits, to the printer 100, the non-update voucher information, that is, the maintain request for the voucher VC described above. In the example of FIG. 5, the target server is the server 300B, and thus the location information (for example, IP address) of the target server matches the location information included in the particular location information SI. Thus, in the example of FIG. 5, the printer 100 determines in S60 that the reuse condition is satisfied (YES in S130 of FIG. 6), and in S62 the printer 100 transmits an approval notification to the server 300B (S140 of FIG. 6).

In S64 of FIG. 5, a service preparation process is executed between the printer 100 and the server 300B. By the service preparation process, the printer 100 is onboarded to the server 300B.

When the processing of FIGS. 4 and 5 is executed, by using the printer 100, the user is able to use the service A provided by the server 300A and the service B provided by the server 300B.

By using the method explained above, there are the following merits, for example. By the above method, the user and the sales company receive provision of a service desired by the user, by registering the voucher VC in the target server (S26, S30 in FIG. 4). Thus, the user and the sales company easily select a service the user should receive.

The printer 100 acquires the connection information CI of the target server from the intermediary server 400 (S34 in FIG. 4, S48 in FIG. 5). Thus, at a stage of the manufacture process of the printer 100, since the intermediary server information RSI used for connection to the intermediary server 400 is stored in the printer 100 (non-volatile memory 130), the connection information CI of the target server need not be stored in the printer 100. The printer 100 acquires, from the target server, the service information required for executing the service process in cooperation with the target server (S46 in FIG. 4, S64 in FIG. 5). Thus, at the stage of the manufacture process of the printer 100, the service information need not be stored in the printer 100. Thus, at the stage of the manufacture process of the printer 100, it is unnecessary to assume a service to use, and even for a service that is started after the manufacture of the printer 100, or a service provided by a third party not recognized by the manufacturer at the time point of manufacture of the printer 100, the user is able to use such services with the printer 100. As a result, the services are flexibly provided and used. For example, a provider of a service may add a new service afterwards without remodeling and so on of the printer 100. For example, the user and the sales company easily select or change a service to use. Since none of the manufacturer, the sales company, or the user of the printer 100 needs to customize the printer 100 for connection to the service desired by a user at the point of shipment or use, burdens on the manufacturer, the sales company, and the user of the printer 100 are reduced.

In the above method, the printer 100 and the target server confirm the authenticity of each other by verification of the voucher VC and the verification of the token. If the printer 100 or the target server fails to confirm the authenticity of the other party, they reject execution of the onboarding process. This suppresses an occurrence of such security problems as onboarding of the printer 100 to an unintended server, onboarding of an illegal device different from the printer 100 to the target server, and so on.

A-3. Advance Preparation for Service after Resale of Printer 100

Hereinafter, the steps up to advance preparation for the service in the printer 100 after resale in a case where the printer 100 is resold from the user A to the user B after the processing of FIGS. 4 and 5 will be described. In the present embodiment, the printer 100 is delivered from the user A to the user B and is connected to the server 300C that provides the service C so that a service process is executable.

Figure 7:
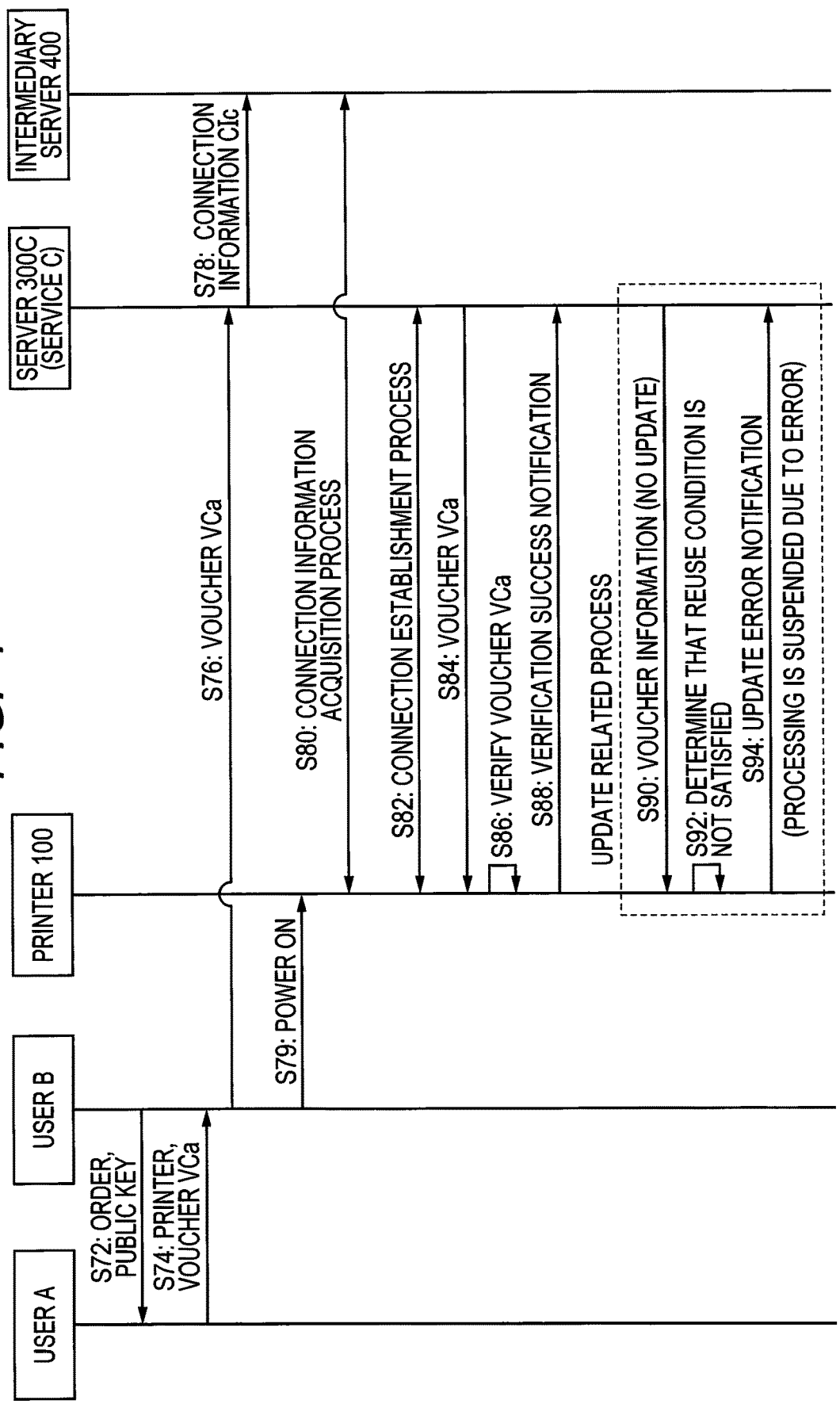
FIG. 7 is a first sequence diagram that the printer 100 is connected to a server 300C such that a service process is executable.
Figure 8:
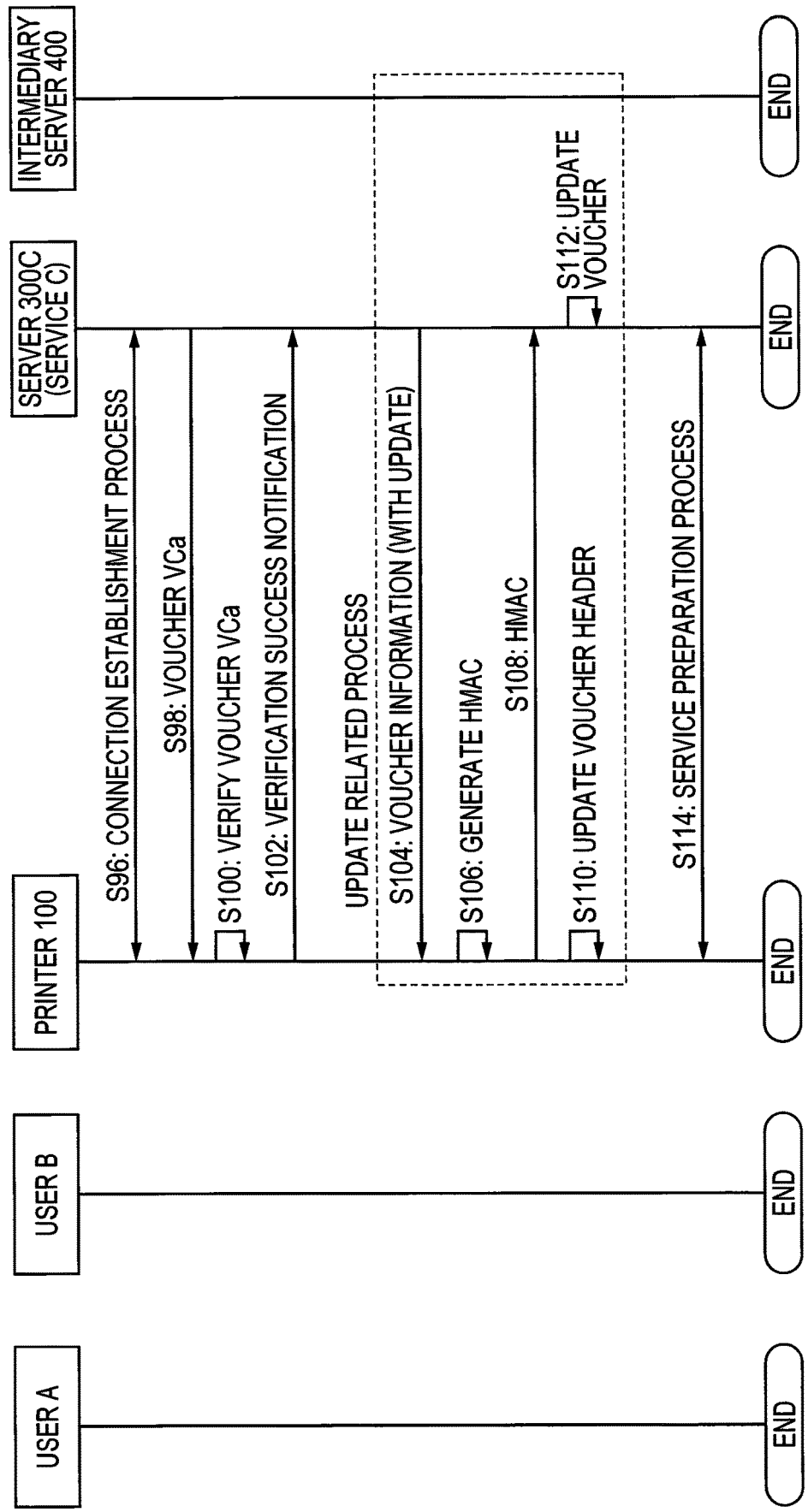
FIG. 8 is a second sequence diagram that the printer 100 is connected to the server 300C such that the service process is executable.

FIGS. 7 and 8 are sequence diagrams from when the printer 100 is delivered from the user A to the user B until the printer 100 is connected to the server 300C so that the service process is executable.

In S72, the user A receives, from the user B, an order for the printer 100 and the public key of the user B. For example, the public key of the user B is transmitted from the terminal apparatus of the user B (not shown) to the terminal apparatus (not shown) of the user A.

In S74, the user B receives the printer 100 and the voucher VCa from the user A. For example, the user A inputs an initialization instruction of the onboard state to the printer 100, initializes the onboard state of the printer 100, and then delivers the printer 100 to the user B. By initializing the onboard state, the printer 100 returns to a state in which the printer 100 is not onboarded to the servers 300A and 300B. Further, the user A uses the terminal apparatus to execute the voucher extension process. Specifically, the terminal apparatus of the user A generates an entry ET including the public key received from the user B and the signature data obtained by encrypting the public key using the private key of the user A. The terminal apparatus of the user A adds the generated entry ET to the voucher VCa received from the sales company B, thereby generating an extended voucher VCa. The terminal apparatus of the user A transmits the extended voucher VCa to the terminal apparatus of the user B. As can be seen from the above-described description, the number of entries en of the voucher VCa received by the user B is 3.

In S76, the user B registers the voucher VCa in the server 300C that provides the service C to be used. Specifically, the user B operates the terminal apparatus to transmit the voucher VCa from the terminal apparatus 200 to the server 300C. The server 300C stores the received voucher VCa in the voucher database VDB.

In response to receiving the voucher VCa, the server 300C registers connection information CIc in the intermediary server 400 in S78. The connection information CIc is connection information CI (FIG. 2D) for connecting to the server 300C. Registration of the connection information CIc is performed in the same manner as S28 of FIG. 4 described above. As a result, the connection information CIc is registered in the intermediary server 400 in association with the GUID of the printer 100.

After registering the connection information CIc in the intermediary server 400, the user B installs the printer 100 so as to be connectable to the Internet IT, and turns on the printer 100 in S79.

When the printer 100 is turned on, a connection information acquisition process is executed between the printer 100 and the intermediary server 400 in S80. The connection information acquisition process is executed in the same manner as S34 of FIG. 4 described above. As a result, the printer 100 acquires the connection information CIc for connecting to the server 300C.

In S82 to S94, the first-time onboarding process is executed between the printer 100 and the server 300C.

In S82, a connection establishment process is executed between the printer 100 and the server 300C. In S84, the server 300C transmits the voucher VCa to the printer 100. In S86, the printer 100 verifies the authenticity of the server 300C by verifying the voucher VCa. When the verification of the voucher VCa is successful, in S88 the printer 100 transmits, to the server 300C, a verification success notification indicating that the verification is successful.

In S90 to S94, an update related process is executed between the printer 100 and the server 300C. In S90, the server 300C transmits, to the printer 100, the non-update voucher information, that is, the maintain request for the voucher VC described above. In the example of FIG. 7, the target server is the server 300C, and thus the location information (for example, IP address) of the target server does not match any location information included in the particular location information SI. Thus, in the example of FIG. 7, the printer 100 determines in S92 that the reuse condition is not satisfied (NO in S130 of FIG. 6), and in S94 transmits an update error notification to the server 300C (S145 of FIG. 6). In this case, as also shown in FIG. 6, the service preparation process is not executed between the printer 100 and the server 300C, and the onboarding process is suspended.

When the onboarding process is suspended by receiving the update error notification, the onboarding process is executed again between the printer 100 and the server 300C as shown in S96 to S114 of FIG. 8. The processing of S96 to S102 of FIG. 8 is the same as the processing of S82 to S88 of FIG. 7.

In S104 to S112, an update related process is executed between the printer 100 and the server 300C. In the second-time onboarding process, in S104, the server 300C transmits, to the printer 100, the updated voucher information, that is, the update request for the voucher VC described above. In response to receiving the update request, the printer 100 generates an HMAC using the updated voucher information in S106, and transmits the HMAC to the server 300C in S108 (YES in S125 of FIG. 6, S135). In S110, the printer 100 updates the voucher header VH stored in the non-volatile memory 130 to a new voucher header VH including the voucher information received in S104 and the HMAC generated in S106. In S112, the server 300C updates the voucher VCa stored in the voucher database VDB to a voucher VCb including the new voucher header VH. The number of entries en in the new voucher VCb at this point is zero. That is, the new voucher VCb does not include the entry ET.

In S114 of FIG. 8, the service preparation process is executed between the printer 100 and the server 300C. By the service preparation process, the printer 100 is onboarded to the server 300C.

Figure 9:
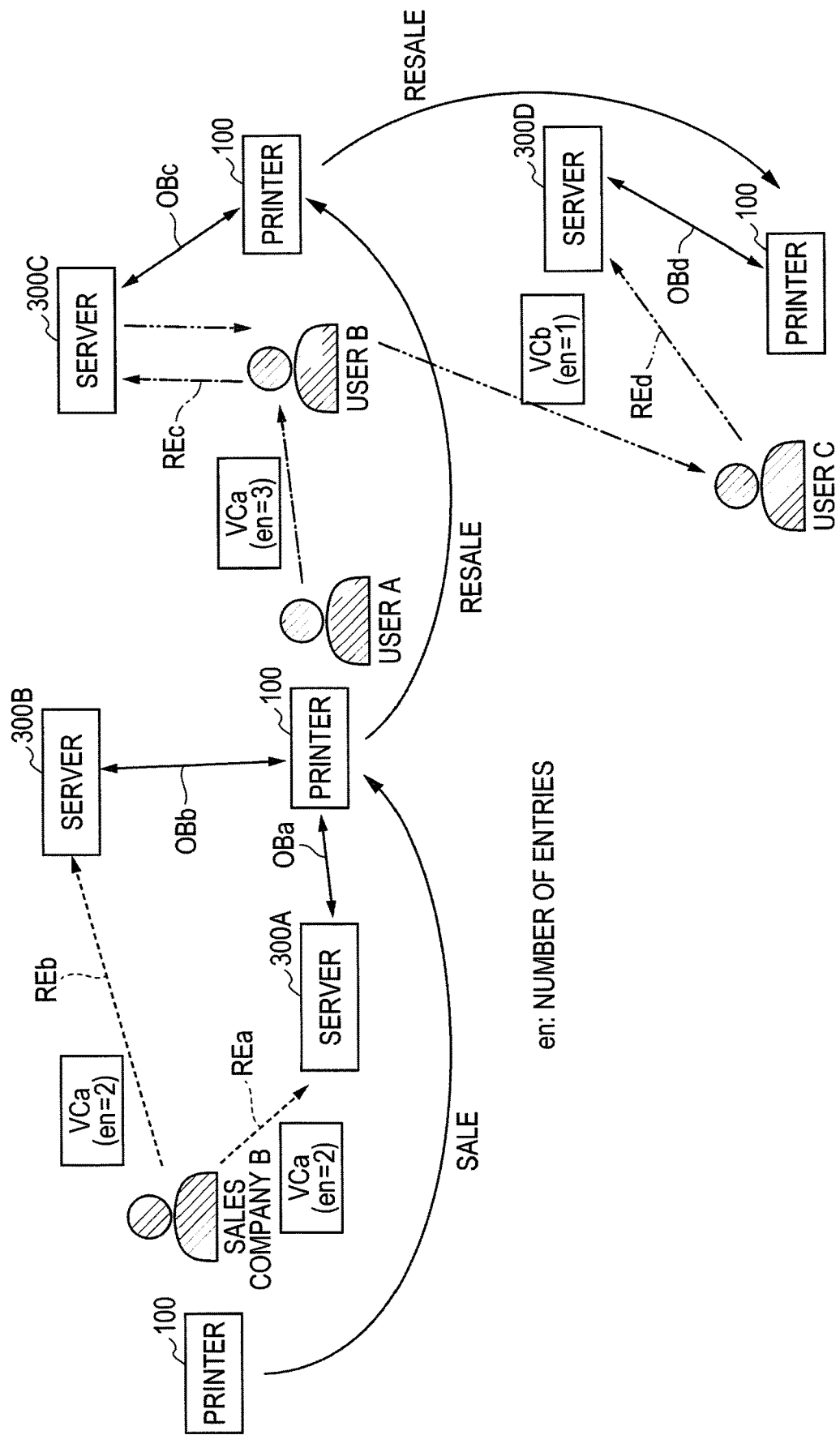
FIG. 9 is a diagram for explaining update and reuse of a voucher VC.

FIG. 9 is a diagram for explaining the updating and the reuse of the voucher VC in the present embodiment. In a case where the update process of the voucher VC is not executed, the same voucher VC is reusable by other target servers after that. For example, in an onboarding process OBa (FIG. 9) between the printer 100 and the server 300A, the update process is not executed as described above (S40 to S44 of FIG. 4). Thus, in an onboarding process OBb (FIG. 9) between the printer 100 and the server 300B, the voucher VCa is treated as the authentic voucher VC. Thus, in the onboarding process OBb, the printer 100 is onboarded to the server 300B using the voucher VCa. Thus, the sales company B registers the voucher VCa in the server 300A in a registration process REa indicated by the arrow in FIG. 9, and registers the same voucher VCa in the server 300B in a registration process REb.

In a case where the voucher VC update process is executed, the same voucher VC is not reusable by another target server after that. For example, in an onboarding process OBc (FIG. 9) between the printer 100 and the server 300C, the update process is executed as described above (S90 to S94 of FIGS. 7, S104 to S112 of FIG. 8). As a result, the voucher VCb after update becomes an authentic voucher, and the voucher VCa before update becomes an invalid (non-authentic) voucher. Similarly, the update process is also executed in an onboarding process OBd between the printer 100 and the server 300D.

As shown of FIG. 9, for example, in a case where the printer 100 is onboarded to the server 300D after the printer 100 is resold by the user B to the user C, the updated voucher VCb needs to be registered in the server 300D in a registration process REd performed before the onboarding process OBd between the printer 100 and the server 300D. Thus, for example, when the user B delivers the printer 100 to the user C, the user B receives the voucher VCb from the server 300C and delivers the voucher VCb to the user C. For example, the user B transmits the public key received from the user C, from the terminal apparatus of the user B to the server 300C. The server 300C uses the received public key to extend the voucher VCb, and transmits the extended voucher VCb (the number of entries en=1) to the terminal apparatus of the user B. The user B transmits the voucher VCb from the terminal apparatus of the user B to the terminal apparatus of the user C. The user C uses the terminal apparatus of the user C to execute the registration process REd for registering the voucher VCb in the server 300D.

According to the embodiment described above, the printer 100 receives the connection information CI associated with the GUID indicating the printer 100 itself from the intermediary server 400, which stores the GUID and the connection information CI in association with each other (S34 of FIG. 4, S48 of FIG. 5, S80 of FIG. 7). The connection information CI is information for connecting to the target server (servers 300A to 300D) that stores the voucher VC. The printer 100 connects to the target server using the connection information CI (S35 of FIG. 4, S50 of FIG. 5, S82 of FIG. 7, and S96 of FIG. 8), and after connecting to the target server, executes processing including communication with the target server (S36 to S46 of FIGS. 4, S52 to S64 of FIGS. 5, S84 to S94 of FIGS. 7, S98 to S114 of FIG. 8). The printer 100 receives the voucher VC from the target server (S36 of FIG. 4, S52 of FIG. 5, S84 of FIG. 7), and verifies whether the voucher VC is authentic (S37 of FIG. 4, S54 of FIG. 5, S86 of FIG. 7). In a case where the voucher VC is authentic (S38 of FIG. 4, S56 of FIG. 5) and the reuse condition is satisfied (S42 of FIG. 4, S60 of FIG. 5), the printer 100 does not update the voucher VC and instead, executes the service preparation process (S46 of FIG. 4, S64 of FIG. 5). In a case where the voucher VC is authentic (S88 of FIG. 7) and the reuse condition is not satisfied (S92 of FIG. 7), the printer 100 executes the update process of updating the voucher VC (S104 to S110 of FIG. 8) and the service preparation process (S114 of FIG. 8). As a result, both security and convenience of the system 1000 including the printer 100 are achieved. Further description will be made below while comparing with comparative examples 1 and 2.

Figure 10:
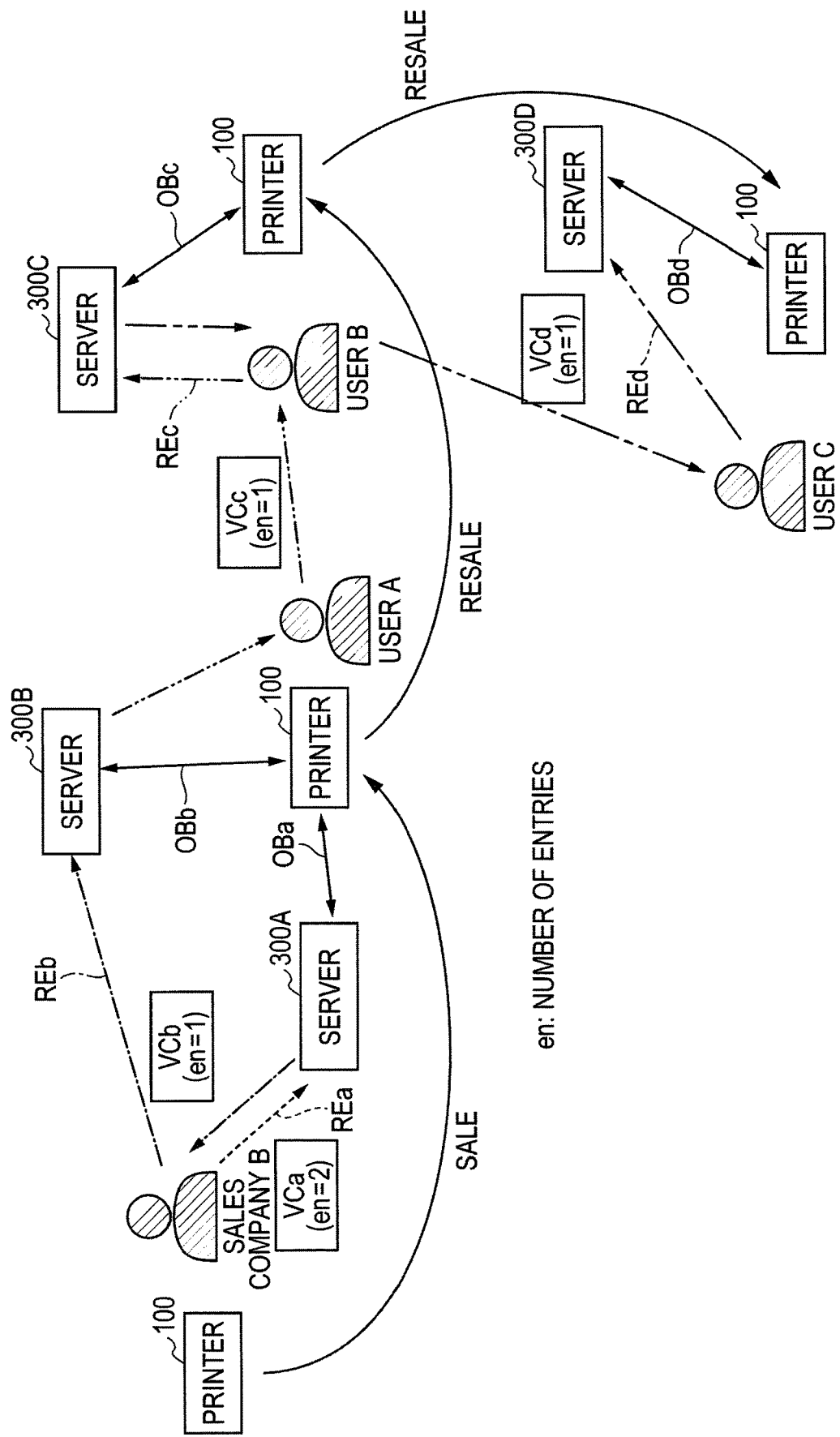
FIG. 10 is an explanatory diagram of a comparative example 1.

A case in which reuse of the voucher VC is always not permitted will be described as comparative example 1. FIG. 10 is an explanatory diagram of the comparative example 1. In Comparative Example 1, reuse of the voucher VC is always prohibited, and thus the voucher VC is updated in each of the onboarding processes OBa to OBd. Thus, the vouchers VC recognized as authentic in each of the onboarding processes OBa to OBd are different vouchers VCa to VCd, respectively (FIG. 10). Thus, different vouchers VCa to VCd need to be registered in the registration processes REa to REd performed prior to the onboarding processes OBa to OBd, respectively.

Thus, in the comparative example 1, for example, the sales company B needs to acquire the updated voucher VCb from the server 300A after performing the onboarding process OBa, and perform the registration process REb for registering the voucher VCb in the server 300B. That is, the sales company B cannot complete the registration process REb when shipping the printer 100 as in the embodiment. The sales company B needs to perform the registration process REb after confirming that the printer 100 has been delivered to the user A, the printer 100 has been turned on, and the onboarding process OBa has been executed, which increases the burden on the sales company B. Alternatively, the user A may confirm that the onboarding process OBa has been executed and then perform the registration process REb, but in this case, the burden on the user A increases. In contrast, according to the present embodiment, the voucher VC is not updated in the onboarding processes OBa and OBb. As a result, the voucher VCa is the authentic voucher VC even after one of the onboarding processes Oba and OBb is executed. Thus, in the present embodiment, the sales company B executes the registration processes REa and REb for registering the voucher VCa when shipping the printer 100. Then, the onboarding processes OBa and OBb are performed when the printer 100 is turned on, and the printer 100 is onboarded to both the servers 300A and 300B. As a result, according to the present embodiment, the convenience of the system 1000 is improved as compared with the comparative example 1.

Figure 11:
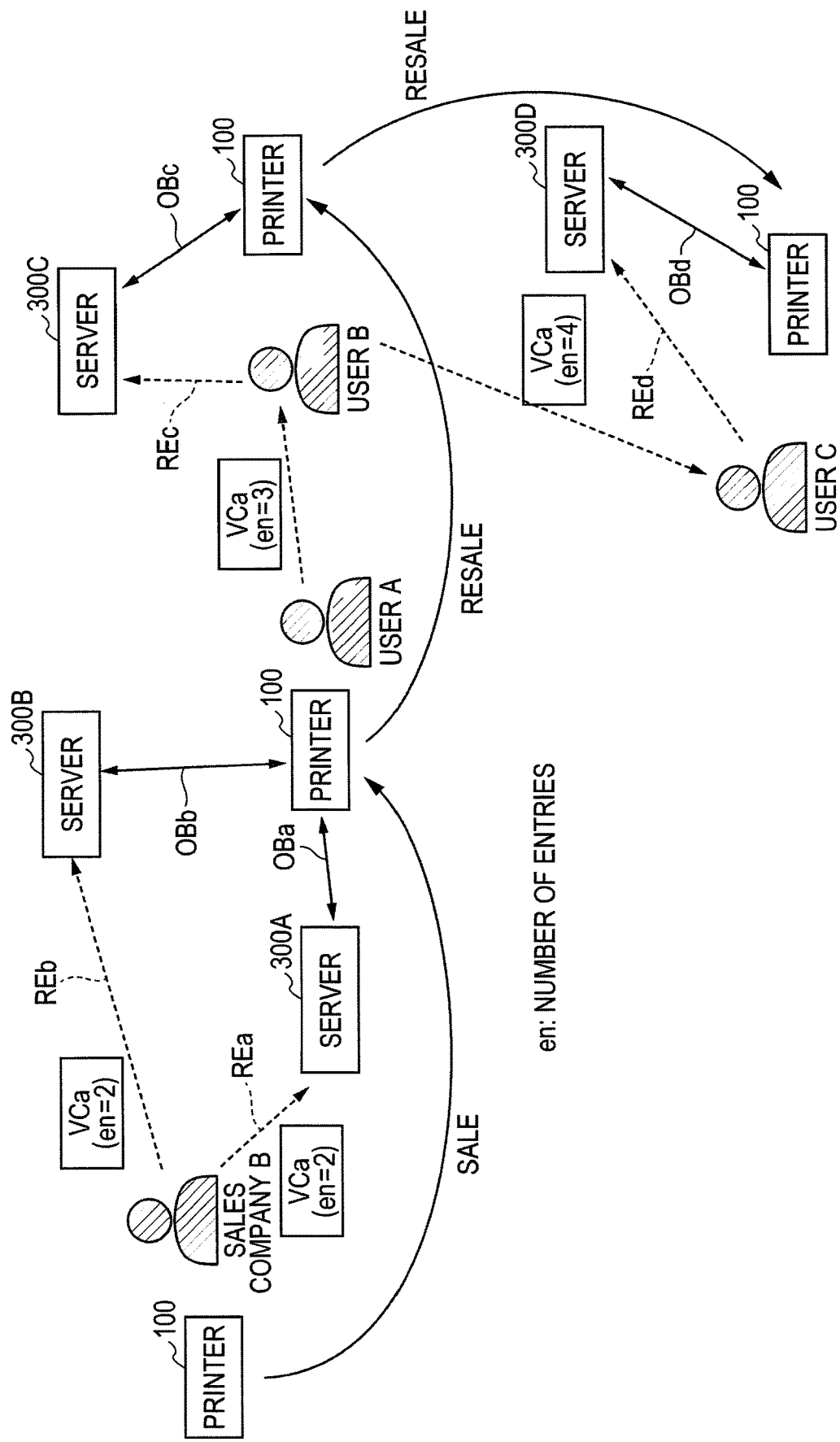
FIG. 11 is an explanatory diagram of a comparative example 2.

Next, a case where reuse of the voucher VC is always permitted will be described as comparative example 2. FIG. 11 is an explanatory diagram of the comparative example 2. In the comparative example 2, reuse of the voucher VC is always permitted, and thus the voucher VC is not updated in any of the onboarding processes OBa to OBd. Thus, the vouchers VC recognized as authentic in each of the onboarding processes OBa to OBd are the same voucher VCa (FIG. 11). Thus, the same voucher VCa is registered in each of the registration processes REa to REd performed prior to each of the onboarding processes OBa to OBd.

Thus, in the comparative example 2, for example, even when the printer 100 is resold a number of times and the owner of the printer 100 is changed, the voucher VCa owned by the previous owner and the sales company B before the current owner always remains authentic. As a result, for example, after the owner of the printer 100 is changed to the user C, if the user A or the sales company B erroneously registers the voucher VCa in the servers 300A, 300B, and so on, the printer 100 is onboarded to the servers 300A and 300B against the user C's intention. Every time the owner of the printer 100 is changed, the number of owners of the authentic vouchers VCa increases, and thus the possibility of leaking the authentic vouchers VCa to third parties also increases. This also increases the possibility that the printer 100 is onboarded to a server not intended by the user C (for example, an illegal server). On the other hand, according to the present embodiment, for example, the voucher VC is updated when the printer 100 is onboarded to a server (for example, the server 300C) different from the servers 300A and 300B having predetermined particular location information. Thus, after the update, the voucher VCa before update cannot be used as an authentic voucher VC. Thus, according to the present embodiment, the possibility that the printer 100 is onboarded to the server against the user's intention is reduced, and the security of the system 1000 is improved compared to the comparative example 2.

As can be seen from the above-described description, according to the present embodiment, the update process of the voucher VC is not executed when the reuse condition is satisfied, and the update process of the voucher VC is executed when the reuse condition is not satisfied. By doing so, both security and convenience of the system 1000 are achieved.

According to the present embodiment, the reuse condition is that the target servers connected to the printer 100 in the onboarding process are particular servers (the servers 300A and 300B in the present embodiment). As a result, the security of the system 1000 is improved because the target servers to which the printer 100 is onboarded without updating the voucher VC are limited. The printer 100 is onboarded to the servers (the servers 300A and 300B in the present embodiment) that provide the services that are highly likely to be used by users to whom the printer 100 is directly sold by the sales company B without updating the voucher VC. Thus, for example, the convenience of the sales company B and the customer of the sales company B (for example, the user A) is improved.

According to the present embodiment, the connection information CI includes location information (for example, IP address or URL) indicating the location of the target server (FIG. 2D), and the printer 100 determines that the reuse condition is satisfied (S130 of FIG. 6) when the location information is the particular location information SI (FIG. 1) indicating the location of the particular server (the servers 300A and 300B in the present embodiment). As a result, the printer 100 determines easily whether the reuse condition is satisfied.

According to the present embodiment, when the reuse condition is not satisfied (NO in S130 of FIG. 6, S92 of FIG. 7), the printer 100 transmits an update error notification to the target server (S145 of FIG. 6, S94 of FIG. 7). The update error notification is information indicating that the voucher VC should be updated, as described above. As a result, the printer 100 causes the target server to update the voucher VC by transmitting the update error notification.

Specifically, in a case where the reuse condition is not satisfied (NO in S130 of FIG. 6, S92 of FIG. 7), in response to receiving, from the target server, information indicating that the voucher VC is not updated (specifically, non-update voucher information (maintain request)), the printer 100 transmits an update error notification to the target server (S145 of FIG. 6, S94 of FIG. 7). In a case where the reuse condition is satisfied (YES in S130 of FIG. 6, S42 of FIG. 4, S60 of FIG. 5), in response to receiving, from the target server, information indicating that the voucher VC is not updated, the printer 100 transmits, to the target server, information (specifically, approval notification) acknowledging that the voucher VC is not updated (S140 of FIG. 6, S44 of FIG. 4, S62 of FIG. 5). As a result, the printer 100 controls whether to update the voucher VC.

As described above, the information acknowledging that the voucher VC is not updated (approval notification) is a value indicating null, and information indicating that the voucher VC should be updated is information indicating a particular error (update error notification). As a result, by transmitting the value indicating null to the target server, the printer 100 notifies the target server that it is acknowledged that the voucher VC is not updated. By transmitting the particular error, the printer 100 notifies the target server that the voucher VC should be updated.

In the above-described embodiment, in a case where the reuse condition is not satisfied, the updated voucher information is received (S104 of FIG. 8) after transmitting the update error notification to the target server (S94 of FIG. 7). By transmitting the HMAC generated using the updated voucher information to the target server (S108 of FIG. 8, S135 of FIG. 6), the voucher VC before update is updated to a voucher VC including the updated voucher information and HMAC (S110, S112 of FIG. 8, S150 of FIG. 6). As a result, the voucher VC is updated when the reuse condition is not satisfied.

As can be seen from the above-described description, the GUID in the above-described embodiment is an example of device identification information, and the voucher VC is an example of authentication information. The updated voucher information is an example of first information and the HMAC is an example of second information.

B. Second Embodiment

A second embodiment differs from the first embodiment in terms of the reuse condition. As shown of FIG. 6, the reuse condition of the second embodiment includes a condition that the number of entries en of the voucher VC is smaller than or equal to a particular number Pn (also referred to as a first condition) and a condition that the voucher VC has not been updated since the printer was shipped from the factory (also referred to as a second condition). The particular number Pn is 2, for example.

In the update related process (FIG. 6) of the second embodiment, the printer 100 determines in S130 that the reuse condition is satisfied in a case where both the first condition and the second condition are satisfied. The printer 100 determines that the reuse condition is not satisfied in a case where either one of the first condition and the second condition is not satisfied. By counting the number of entries ET included in the voucher VC received from the target server, the printer 100 recognizes the number of entries en of the voucher VC and determines whether the first condition is satisfied. For example, the printer 100 stores a voucher update flag (not shown) in the non-volatile memory 130. The voucher update flag is set to OFF at the time of shipment from the factory. In S150, the printer 100 sets the voucher update flag to ON when updating the voucher VC (the voucher header VH). The printer 100 determines in S130 that the second condition is satisfied in a case where the voucher update flag is OFF.

For example, in the example of FIG. 9, the number of entries en in the voucher VCa used in the onboarding processes OBa and OBb is 2. Since the voucher VCa is the voucher VC created at the time of shipment from the factory, the voucher VC has not been updated since the shipment from the factory. Thus, in the onboarding processes OBa and OBb, it is determined that the reuse condition is satisfied, and the voucher VC is not updated.

In the example of FIG. 9, at the time when the onboarding process OBc is performed, the printer 100 has been resold from the user A to the user B, and thus the number of entries en in the voucher VCa used in the onboarding process OBc is 3. Thus, in the onboarding process OBc, it is determined that the reuse condition is not satisfied because the first condition is not satisfied, and the voucher VC is updated.

In the example of FIG. 9, the voucher VCb used in the onboarding process OBd is different from the voucher VCa generated at the time of shipment from the factory. That is, the onboarding process OBd is performed after the voucher VC is updated. Thus, in the onboarding process OBd, it is determined that the reuse condition is not satisfied because the second condition is not satisfied, and the voucher VC is updated. As a result, in the second embodiment as well, both security and convenience of the system 1000 are achieved, as in the first embodiment.

According to the second embodiment described above, the voucher VC includes one or more entries ET that increase according to the change of the owner of the printer 100 (FIG. 2B). The reuse condition includes the first condition that the number of entries ET (the number of entries en) included in the voucher VC is smaller than or equal to the particular number Pn, as described above. When there is a change in the owner of the printer 100, it may be advantageous to update the voucher VC from the viewpoint of security. For example, as described above, when a past owner of the printer 100 owns an authentic voucher VC, there is a possibility that the printer 100 is onboarded to a target server against the intention of the current user of the printer 100. According to the present embodiment, whether to update the voucher VC is appropriately switched using the number of entries ET that increases according to a change in the owner of the printer 100. Thus, both security and convenience of the system 1000 are achieved.

C. Modification

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided below.

(1) In the first embodiment described above, the particular location information SI of FIG. 1 includes the location information of the servers 300A and 300B, and the location information SI is stored in the non-volatile memory 130 in the factory. Alternatively, for example, the particular location information SI stored at the factory may be only the location information of the target server that provides the setup service, for example, the server 300A, and other particular location information (for example, the location information of the server 300B) may be obtained from the server 300A. For example, after the printer 100 is onboarded to the server 300A (after the service preparation process of S46 of FIG. 4), as shown in S47 surrounded by a broken line of FIG. 4, the location information of the server 300B may be transmitted from the server 300A to the printer 100 as particular location information.

According to this modification, the printer 100 receives the location information of the server 300B from the server 300A as particular location information when connecting to the server 300A (S47 of FIG. 4), and determines whether the reuse condition is satisfied based on the particular location information when connecting to the server 300B (S60 of FIG. 5). That is, at the time when the printer 100 is manufactured, the particular location information of the server 300B is not stored in the printer 100, but the printer 100 acquires the particular location information later. As a result, for example, even if the target server is a server that has newly started a service after the printer 100 is manufactured, the voucher VC is not updated in the onboarding process with the target server. Thus, after the printer 100 is manufactured, the target server to be specified by the particular location information is easily added or deleted.

(2) The reuse conditions in each of the above-described embodiments are examples, and are not limited thereto. For example, the reuse condition may be that the number of times of onboarding processes performed after the printer 100 is manufactured is smaller than or equal to a particular number (for example, two times). The reuse condition may be that it is within a particular period of time (for example, one hour or one week) from the first power-on after the printer 100 was shipped from the factory. The reuse condition may be, for example, an appropriate combination of the reuse condition of each of the above-described embodiments and the reuse condition exemplified in this modification. For example, the reuse condition may be that the number of entries en in the voucher VC is smaller than or equal to a particular number and it is within a particular period of time from the first power-on, or that the number of entries en in the voucher VC is smaller than or equal to a particular number and the location information of the target server is the particular location information.

(3) In the first embodiment, when determining the reuse condition, the printer 100 determines whether the target server is the particular server based on whether the location information (for example, IP address) of the target server is particular location information. Alternatively, for example, in the course of the onboarding process (for example, in the course of the authentication process), the target server may transmit particular information (for example, the name of the service to be provided) to the printer 100, and the printer 100 may determine whether the target server is a particular server based on the particular information.

(4) In each of the embodiments described above, in the onboarding process, the printer 100 updates and maintains the voucher VC, which is authentication information, in accordance with TO2 defined in the FDO specifications. The printer 100 may update and maintain the authentication information using another method, such as the specifications defined by the manufacturer of the printer 100, for example, if the target server supports the method.

In this case, for example, information other than null may be used in the approval notification transmitted from the printer 100 to the target server. Information different from the update error notification may be used as the information indicating that the authentication information should be updated, which is transmitted from the printer 100 to the target server.

In this case, for example, when the reuse condition is not satisfied, the printer 100 may generate updated authentication information and transmit the updated authentication information to the target server. In a case where the reuse condition is satisfied, the printer 100 may transmit the same authentication information as before update to the target server. The target server may store the authentication information transmitted from the printer 100 as valid authentication information in its own memory.

(5) In each of the above-described embodiments, the printer 100 and the target server operate according to the FDO specifications, and thus the voucher VC including the GUID is used as the authentication information. Thus, since the voucher VC includes the GUID, the voucher VC is associated with the GUID. Thus, the voucher VC is associated with the device to which the GUID is assigned (the printer 100 in the present embodiment). Alternatively, the authentication information may be information different from the voucher VC when another technique, for example, specifications defined by the manufacturer of the printer 100 is used. In this case, for example, the target server may record particular device identification information (for example, a serial number) and particular authentication information that does not include the device identification information in a table in association with each other. In the onboarding process, the target server may transmit particular authentication information to the printer 100, and the printer 100 may verify whether the particular authentication information is authentic.

(6) In each of the above embodiments, the printer 100 is adopted as the device. Alternatively, another device that cooperates with the target server to provide a service to a user may be employed. The services using other devices include, for example, a service of remotely controlling other devices (for example, surveillance cameras, electrical appliances such as cooking utensils) set in homes and offices from a terminal apparatus (terminal application) via a target server.

(7) In the above embodiments, a part of the configurations implemented by hardware may be replaced with software, or conversely, a part or all of the configurations implemented by software may be replaced by hardware.

What is claimed is:
1. A device comprising:
a communication interface; and
a controller configured to:
receive, via the communication interface, device identification information and connection information from an intermediary server, the device identification information indicating the device, the intermediary server being configured to store the device identification information and the connection information in association with each other, the connection information being information for connecting to a target server, the target server being configured to store authentication information in association with the device identification information;

connect, via the communication interface, to the target server by using the connection information; and after connecting to the target server, perform a particular process including communication with the target server, the particular process including:

receiving, via the communication interface, the authentication information from the target server;

verifying whether the authentication information is authentic;

in response to determining that the authentication information is authentic and that a particular condition is satisfied, performing a post-authentication process without performing an update process of updating the authentication information; and in response to determining that the authentication information is authentic and that the particular condition is not satisfied, performing the update process and the post-authentication process.

2. The device according to claim 1, wherein the particular condition is that the target server is a particular server.

3. The device according to claim 2, wherein the connection information includes location information indicating a location of the target server; and wherein the particular condition includes that the location information is particular location information indicating a location of the particular server.

4. The device according to claim 3, wherein the target server includes a first target server and a second target server; and wherein the controller is configured to:

when connecting to the first target server, receive, from the first target server, location information of the second target server as the particular location information; and when connecting to the second target server, determine whether the particular condition is satisfied based on the particular location information.

5. The device according to claim 1, wherein the authentication information includes one or more particular information that increases as an owner of the device changes; and wherein the particular condition includes that a number of the one or more particular information included in the authentication information is smaller than or equal to a particular number.

6. The device according to claim 1, wherein the controller is configured to:

in response to determining that the particular condition is not satisfied, transmit, to the target server, information indicating that the authentication information should be updated.

7. The device according to claim 6, wherein the controller is configured to:

in response to receiving, from the target server, information indicating that the authentication information is not updated and determining that the particular condition is satisfied, transmit, to the target server, information acknowledging that the authentication information is not updated; and in response to receiving, from the target server, information indicating that the authentication information is not updated and determining that the particular condition is not satisfied, transmit, to the target server, information indicating that the authentication information should be updated.

8. The device according to claim 7, wherein the information acknowledging that the authentication information is not updated is a value indicating null; and wherein the information indicating that the authentication information should be updated is information indicating a particular error.

9. The device according to claim 7, wherein the controller is configured to:

after transmitting, to the target server, the information indicating that the authentication information should be updated, receive, from the target server, first information that constitutes a part of the authentication information; and transmit, to the target server, second information generated by using the first information, thereby updating the authentication information to an updated authentication information including the first information and the second information.

10. The device according to claim 1, wherein the post-authentication process is a service preparation process of exchanging service information necessary for executing a service process between the device and the target server.

11. The device according to claim 1, wherein the device is a printer configured to print an image on a print medium; and wherein the target server is configured to provide a service including a setup service, a consumable management service, or a print service, the setup service being a service for installing programs in the printer and performing particular settings, the consumable management service being a service for managing a remaining amount of a consumable in the printer, the print service being a service for generating a print job and transmitting the generated print job to the printer for printing.

12. The device according to claim 3, further comprising a memory, wherein the memory stores the particular location information.

13. The device according to claim 9, wherein the authentication information is a voucher that certifies ownership of the device;

wherein the first information is voucher information updated by the target server, the voucher information including the device identification information and a public key; and wherein the second information is a message authentication code.

14. The device according to claim 1, wherein the particular condition includes that the authentication information is not updated since the device is shipped from a factory.

15. The device according to claim 1, wherein the particular process is an onboarding process that is performed between the device and the target server; and wherein the particular condition includes that a number of times of the onboarding process performed after the device is manufactured is smaller than or equal to a particular number.

16. The device according to claim 1, wherein the particular condition includes that it is within a particular period of time from first power-on after the device is shipped from a factory.

17. The device according to claim 2, wherein the controller is configured to:

receive, from the target server, a name of a service to be provided by the target server; and determine whether the target server is the particular server based on the name of the service.

18. A non-transitory computer-readable storage medium storing a set of program instructions for a device comprising a controller and a communication interface, the set of program instructions, when executed by the controller, causing the device to:
- receive, via the communication interface, device identification information and connection information from an intermediary server, the device identification information indicating the device, the intermediary server being configured to store the device identification information and the connection information in association with each other, the connection information being information for connecting to a target server, the target server being configured to store authentication information in association with the device identification information;
- connect, via the communication interface, to the target server by using the connection information; and
- after connecting to the target server, perform a particular process including communication with the target server, the particular process including:
  - receiving, via the communication interface, the authentication information from the target server;
  - verifying whether the authentication information is authentic;
  - in response to determining that the authentication information is authentic and that a particular condition is satisfied, performing a post-authentication process without performing an update process of updating the authentication information; and
  - in response to determining that the authentication information is authentic and that the particular condition is not satisfied, performing the update process and the post-authentication process.

* * * * *